United States Patent Office 2,738,337
Patented Mar. 13, 1956

2,738,337
LECITHIN MODIFIED ALKYD VARNISHES

Maynard B. Unger, Chicago, Ill., assignor to The Sherwin-Williams Company, Cleveland, Ohio, a corporation of Ohio No Drawing. Application March 4, 1953,
Serial No. 340,393

7 Claims. (Cl. 260—22)

This invention relates to a method of improving oil modified alkyd resins useful primarily in the protective coatings industry. More particularly, this invention relates to a method for improving the wetting characteristics of oil modified alkyd resinous varnishes by the incorporation therein of minor quantities of lecithin during the last stages of varnish manufacture and to the products resulting from the method.

The specific field of use of the products of this invention are found to be primarily important in the preparation of color bases which may be either let down with a variety of materials to form completed paints or which may be used to shade or tint previously prepared white bases to the desired color.

Heretofore, one of the difficulties encountered with the oil modified alkyd resins has been the relatively stiff pastes which result upon mixing the alkyd varnish with a requisite quantity of pigment to produce a ball mill charge capable of being processed to produce a finely divided dispersion of pigment in varnish or a color base. Oil modified alkyds of the class described in my copending application entitled "Rosinamine Modified Alkyd Resins," U. S. Serial No. 289,016, filed May 20, 1952, now abandoned, of which this application is a continuation-in-part, has been found to possess some improvement in pigment wetting over prior art alkyds.

It has been found, however, that additional improvement in rosinamine modified alkyd resins, described in the aforementioned application for patent, can be obtained by the further step of including small percentages of lecithin in the oil modified primary rosinamine modified alkyd resinous varnish solids after the neutralization reaction has been completed, but prior to cooling the varnish to room temperature by the addition of the requisite proportion of volatile solvents. (This dilution with solvent step is well known in varnish technology.)

Further experimentation has shown that the use of rosinamine as a part of the alkyd forming reactant, while extremely beneficial, is not essential to effect improvement in the wetting characteristics of oil modified alkyd varnishes of the class made in the art today. The value and improvement brought about solely by the incorporation of lecithin at elevated temperatures into an oil modified alkyd varnish may be illustrated by the following examples wherein oil modified alkyds both with and without rosinamine and lecithin were employed in the production of a standard color base by ball milling techniques. Parts are by weight unless otherwise specified.

Example 1

This example is set forth to illustrate the preparation of an oil modified alkyd varnish standardly used in the preparation of a color base.

344 parts soya bean oil
66 parts pentaerythritol were alcoholized in the presence of a small amount of litharge as catalyst at a temperature between 380° to 500° F. (450° F. preferred) for one hour. Thereafter, 138 parts of phthalic anhydride were added to the reaction mass and the temperature taken to 480° F. and held for five hours. During the latter part of the cook, the batch was blown with $CO_2$ and upon reaching an acid value of 7, the pill was cut to 70 percent solids with mineral spirits to yield a varnish having a viscosity of V–W (Gardner).

Example 2

A standard color base was prepared by charging a ball mill with 400 parts varnish of Example 1
148 parts phthalocyanine blue
33 parts methyl ethyl ketoxime (17% solution in mineral spirits)
260 parts zinc resinate containing about 5% zinc metal on a total weight basis
53 parts high-flash naphtha After ball milling for 18 hours, the material could not be removed from the mill as the viscosity of the paste was too heavy to flow. Even upon addition of 100 percent excess thinner, the paste could not be readily removed from the mill.

Example 3

344 parts soya bean oil
33 parts pentaerythritol were taken to 400° F. in a varnish kettle equipped with agitator and thermometer. Upon reaching 400° F., a small amount of litharge as alcoholysis catalyst was added after pasting it in a small proportion of soya oil. The temperature was thereafter taken to 450° F. and held for about 45 minutes. The end point was checked by adding a proportionate amount of phthalic anhydride to the split oil, followed by heating at 400° F.±20°. If a clear test sample develops, the alcoholysis of the polyester is sufficient to proceed. Thereafter 120 parts phthalic anhydride
100 parts rosinamine were added to the reaction mass. The temperature was held at 440° F. for one hour. Thereafter the temperature was allowed to increase to 525° F. at which time a light $CO_2$ blow was started through the resin forming reactant. The temperature was held at 525° F. for four hours. Six parts of lecithin were added and heating discontinued. After thorough incorporation of the lecithin, (approximately 5–10 minutes) the base resin was reduced to 90 percent solids with mineral spirits. The final varnish product had an acid value of 4.1 and a viscosity of U. (Gardner).

Example 4

A mill charge was made up similar to Example 2 except for substitution of the varnish of Example 3 for the varnish of Example 1. After 18 hours of mill time, the color base was found to have an excellent degree of dispersion and to be flowable so that the color base was readily discharged from the ball mill.

Example 5

1648 parts soya bean oil were alcoholized with 268 parts pentaerythritol in the presence of a litharge catalyst at a temperature of 450° F. over approximately a one-hour period. Thereafter 982 parts rosin
285 parts phthalic anhydride
27 parts maleic anhydride were added and the reactants were initially heated to a temperature of 365° F. for 30 minutes, thereafter the temperature was increased to 480° F. and held for approximately eight hours to a viscosity of Z₆ (Gardner) at 90 percent solids and an acid value of 6. While the alkyd vehicle solids were at a temperature of 480° F. at the end of the cook and before cutting the batch with volatile solvent, 31 parts of a commercial lecithin containing about 25 percent of soya oil, etc., were added and thoroughly incorporated into the hot resin. Within 10 minutes thereafter, the batch was cut to 90 percent solids with mineral spirits yielding a product having an acid value of 4 and a viscosity of Y+ (Gardner).

*Example 6*

A ball mill was charged with 2 lbs. a ball mill was charged with
240 parts phthalocyanine green
33 parts methyl ethyl ketoxime
275 parts zinc resinate solution (as in Example 2)
386 parts varnish of Example 5
27 parts high-flash naphtha After ball milling for 18 hours to a 5 grind (Hegman) the color base formed was sufficiently fluid to be readily removed from the mill. Comparative batches of varnish made over the formula of Example 5 by excluding the lecithin produced a color base of such high viscosity under the same milling conditions as priorly described that the color base could be removed from the mill only with great difficulty.

*Example 7*

Same as Example 2, except prior to milling 8 parts of lecithin were added to the cold mill charge. After 18 hours' ball milling an attempt was made to unload the mill charge. Flow characteristics of the mill content were such that the paste would not flow from the mill.

*Example 8*

715 parts burnt sienna
7 parts calcium stearate
14 parts zinc resinate solution in mineral spirits.
20 parts methyl ethyl ketoxime
354 parts alkyd of Example 1
167 parts kerosene were ball milled 12 hours. The charge was diluted with mineral spirits but still did not flow sufficiently to be removed from the ball mill.

The example was repeated utilizing the alkyd varnish of Example 3. No difficulty was had in removing the great bulk of the mill charge from the ball mill.

Burnt sienna was found to be one of the most difficult to prepare color bases from the standpoint of proper wetting during the pigment dispersion or grinding step.

*Example 9*

A varnish was prepared as in Example 3, with the exception that the 6 parts of lecithin were added simultaneously with the 120 parts of phthalic anhydride and 100 parts of primary rosinamine. Upon completion of the cook the color of the varnish was too dark to be useful due to, it is believed, decomposition of the lecithin.

The above examples have been selected to show the preparation of an alkyd by cooking in lecithin at the end of the cook and to illustrate the value of the novel step over the mere cold addition of lecithin. While it is not known why the marked difference in behavior results, it is known that the lecithin does break down to a greater or lesser extent when held at alkyd-forming temperatures for prolonged periods of time. There are some reasons for believing that the lecithin may react with the alkyd-forming reactants at the temperatures found to be useful but proof of the mechanism involved has not been established. It has been observed that a primary rosinamine present in the alkyd cook intensifies the sought-for wetting improvement of lecithin and the two together produce a desirable combination. Rosinamine is not essential, however, and lecithin alone produced a marked change in the flow character of color bases, as herein described.

The above examples demonstrate the general practice of the invention and the value of the advance in the preparation of color bases. They are not to be construed as limiting but only illustrative. General points of interest of limiting nature relative to the invention follow.

By the term "lecithin" as used herein, it is meant to include both the highly purified forms of lecithin which are available commercially as dry yellow granules, principally derived from soya beans as well as other commercial grades of lecithin which may contain appreciable quantities of soya oil and other native impurity. The latter lecithin product is characterized by its brownish color and grease-like physical appearance due presumably to the soya bean oil present.

By the term "rosinamine" is meant to include compounds characterized by an organic residue having a structure similar to the structure of the organic residue of abietic acid. The useful rosinamines are believed to be derived from rosin through replacement of the carboxyl radicle with a methyl amine group. Rosinamines useful include dehydrorosinamine, di-hydrorosinamine, and tetrahydrorosinamine and mixtures of primary rosinamines. The components of oil modified alkyd resins are so well known that it seems unnecessary to review the alkyd art in setting forth the components presently used in the coating industry for the production of oil modified alkyd varnishes. It is well known, for example, that oil modified alkyds may be produced with linseed, dehydrated castor, soya, safflower, fish, etc., oils. Polyols useful are primarily glycerin, pentaerythritol, dipentaerythritol, ethylene glycol, aryl polyether alcohols, etc. While the principal polycarboxylic acid employed is phthalic anhydride, other dibasic acids formed by condensation of maleic anhydride with unsaturated compounds, e. g., dicyclopentadiene, can be employed.

Some improvement has been observed by inclusion of as little as 0.5 percent of lecithin based on the oil modified alkyd resin solids. One to 3 percent of lecithin has given the optimum result, and larger percentages are deemed excessive. Five percent of lecithin on a similar basis has been utilized with no appreciable improvement noted over the 3 percent quantity.

As stated above, the amount of primary rosinamine present may be zero. Rosinamine is not essential to obtain beneficial effect from working in lecithin at the end of alkyd resin manufacture. However, from 5 percent to about 20 percent of rosinamine appears to have an ancillary or synergistic effect upon the lecithin and the combination of the two additives provides a superior oil modified alkyd for use as a grinding vehicle or varnish. Further details may be found relative to rosinamine modified alkyds in my copending application, U. S. Serial No. 289,016. The temperature of addition of lecithin at the end of the alkyd cook has not been found overly critical. The broad range of usefulness appears to lie within a temperature range of between 300° F. and 550° F. A preferable range of temperature has been found to be from 400° F. to 500° F. Too high a temperature of addition of lecithin to the hot alkyd reaction mass is to be avoided as well as too prolonged a period at temperatures within the ranges stated. This for the reason that the lecithin is found to break down excessively to discolor the resultant varnish if it is allowed to be in contact with the alkyd-forming reactants during the esterification reaction, or too long at 350–500° F. range prior to the final cooling by dilution of the oil modified resinous varnish solids with volatile solvent, a customary last step in the manufacture of varnishes. It should be noted from the illustrative examples that the addition of lecithin to the hot alkyd as described above gives an entirely different effect in the preparation of color bases than is obtained by the customary practice in the art of adding lecithin to a cold mix of pigment and vehicle prior to the grinding step (see example 7). It is acknowledged that the use of lecithin by cold addition in the manufacture of coating compositions to improve color characteristics as to flooding and floating are old. However, the utility of cooking lecithin into the alkyd after the final characteristics of the varnish have been achieved in the neutralization reaction is believed to produce an entirely new and novel effect not heretofore realized, thus improving resultant oil modified alkyd varnishes. The percentage of oil in the oil modification of the alkyd can be varied over wide limits. Benefits have been observed in alkyds containing from 50 percent to as much as 85 percent of oil based on the total non-volatile portion of the varnish. In longer oil length, alkyds, there is a greater tendency for pigments to be wetted out by such varnishes, thus the necessity for improving the wetting quality is not as apparent in shorter oil length alkyd varnishes.

While it might be anticipated that cooking lecithin into an oil modified alkyd would have a detrimental effect upon the drying rate of films deposited therefrom, such effect has not been observed in the application of the above-described methods and products to their intended end use. As it is customary to leave a color base down by addition of further quantities of varnish vehicle, the dilution factor may be involved in the lack of noticeable increase in the drying rate of finished coatings. Additional advantage has been observed in certain chrome yellow color bases wherein a tendency for the base to liver has been objectionable. In one trial, with lecithin cooked in the alkyd, as described herein, the chrome yellow base did not liver in over six months time; whereas, this defect was observed in the standard color base containing no lecithin treatment within four days. "Livering," as the name implies, is a condition in a color base wherein a liver-like gel is formed which is not dispersible in a paint system merely by agitation.

Having thus described and illustrated the best mode of accomplishing the ends of my invention, I claim:

1. In the manufacture of an oil modified alkyd resinous varnish vehicle wherein the resin-forming reaction is completed at a temperature of from 300° to 550° F., the improvement in process which comprises adding lecithin to the completed resin while within said temperature range in an amount not exceeding 5 percent by weight of said resin, dispersing the lecithin in the hot resin, and thereafter cooling the reaction mass below said temperature range.

2. In the manufacture of an oil modified alkyd resinous varnish through mutual reaction between drying oil fatty acid groups, a polyol and a polycarboxylic acid at temperatures from 300° F. to 550° F., the improvement which comprises treating said resinous product within said temperature range with from 0.5 percent to 5 percent by weight of the vehicle solids thereof of lecithin, and thereafter cooling the varnish to below said temperature range.

3. In the manufacture of an oil modified alkyd resinous varnish through esterification and interesterification of drying oil fatty acid groups, a polyol and polycarboxylic acids at temperatures from 300° to 550° F., the improvement which comprises incorporating therein not more than about 5 percent of lecithin by weight of the resin charge subsequent to the neutralization step but prior to the final cooling of the kettle charge by dilution with solvent step.

4. In the manufacture of an oil modified alkyd resinous varnish through mutual reaction between drying oil fatty acid groups, a polyol and a polycarboxylic acid at temperatures from 300° F. to 550° F., the improvement which comprises replacing a portion of the total polyol present with a sufficient quantity of a primary rosinamine to produce an essentially neutral resin product, and at the termination of the resin-forming reaction adding and incorporating in the hot resin not more than about 5 percent of lecithin, and thereafter cooling the reaction mass to below 300° F. by dilution with volatile solvent.

5. A method of improving the pigment wetting and suspension characteristics of an oil modified alkyd resinous varnish which comprises incorporating from 0.5 percent to not more than about 5 percent of lecithin by weight based upon the varnish solids in the formed resinous mass subsequent to the esterification step but while the temperature of the varnish solids is above 300° but less than 550° F. and prior to the final cooling of the resinous mass by dilution with solvent.

6. In the manufacture of a drying oil modified alkyd resinous varnish through esterification and interesterification of drying oil fatty acid groups, a polyol and a dicarboxylic acid at a temperature of from 400° F. to 500° F., the improvement which comprises incorporating from about 1 to 3 percent by weight of the resin solids of lecithin at the conclusion of the neutralization step, but prior to the final cooling of the formed varnish solids by the dilution with solvent step.

7. A method of preparation of an improved color base for shading fluid coatings which comprises dispersing the dry color pigment in an oil modified alkyd varnish vehicle containing from about 1 percent to about 3 percent of lecithin by weight of the said vehicle solids incorporated therein at a temperautre in excess of 300° F. but not more than 550° F. prior to the dispersion step.

References Cited in the file of this patent

UNITED STATES PATENTS

| 2,067,234 | Gordon | Jan. 12, 1937 |
| 2,201,064 | Thurman | May 14, 1940 |
| 2,212,369 | Jaeger | Aug. 20, 1940 |
| 2,296,933 | Jordan | Sept. 29, 1942 |

FOREIGN PATENTS

| 571,783 | Great Britain | Sept. 10, 1945 |

OTHER REFERENCES

"Lecithin In Paints," Paint, Oil and Chem. Review, 116, pages 27, 28, 30, 36, 37, (June 18, 1953).